Patented Nov. 21, 1939

2,180,353

UNITED STATES PATENT OFFICE 2,180,353

VANADIUM OXIDE CATALYST

Harold B. Foster, Williamsville, N. Y., assignor to National Aniline & Chemical Company, Inc., New York, N. Y., a corporation of New York No Drawing. Application January 6, 1933, Serial No. 650,593

22 Claims. (Cl. 23—234)

This invention relates to the catalytic oxidation of chemical compounds in the gas or vapor phase, and more particularly to contact masses employed as catalysts in such reactions and to processes of preparing such contact masses. It relates specifically to improvements in contact masses containing vanadium oxide as catalytically active material and in the methods of preparing such contact masses.

An object of the present invention is to provide a contact mass comprising vanadium oxide in a catalytically active form associated with a suitable carrier, in which contact mass the carrier retains the catalytic vanadium oxide with sufficient adherence to resist the dusting and erosion incident to handling and charging of the catalyst to the apparatus, and operation of the process.

Another object of the invention is to provide a contact mass comprising vanadium oxide in a catalytically active form as a coating on a suitable carrier, in which contact mass the carrier retains the catalytic vanadium oxide with sufficient adherence to enable the contact mass to be discharged from and recharged to catalytic apparatus without excessive loss of the active coating.

A further object of the invention is to provide a product comprising a reduced vanadium compound associated with a catalyst carrier which product does not contain compounds that decompose upon ignition to form a friable vanadium oxide, and which reduced vanadium compound is highly adhesive so that it is firmly retained by the carrier and thereby enables the partially formed contact mass to be handled without special care.

Still another object of the invention is to provide a new form of vanadium oxide catalyst of high catalytic activity.

An additional object is to provide processes for preparing said catalysts and contact masses.

Other objects of the invention will in part be obvious and will in part appear hereinafter.

The catalytic oxidation of chemical compounds by a process in which a gaseous reaction mixture of the chemical compound and an oxidizing gas is passed in contact with a contact mass is well known, and many metallic oxides are known to be useful as catalysts in such processes. Chief among these are the catalysts containing oxides of vanadium either alone or in combination with other oxides or compounds. Since the extent of the catalytic reaction which takes place is a function of the catalytic surface contacted by the gaseous reaction mixture, it is desirable that the vanadium oxide be in a form which exposes a maximum of active surface to the gaseous reaction mixture. For this reason it has heretofore been proposed to prepare contact masses in which the vanadium oxide is in the form of a relatively thin coating upon particles of suitable material serving as a carrier or catalyst support.

One usual method of preparing vanadium oxide contact masses is to coat or impregnate particles of the carrier with a solution of ammonium meta-vanadate, evaporate the resulting mass to dryness, thereby producing a coating of the ammonium meta-vanadate on the carrier, and then heat or "ignite" the coated carrier in a stream of oxidizing gas to convert the ammonium meta-vanadate to the desired catalytically active vanadium oxides.

As the catalytic process generally involves the absorption or evolution of considerable quantities of heat, it is usually the practice to carry out the process in a form of apparatus in which the contact mass is in intimate heat transferring relation, but out of contact, with a temperature controlling medium. In the forms of apparatus frequently employed, the contact mass is contained in the form of shallow layers over or through which the gaseous reaction mixture is passed, or in the form of small rods contained in vertical or horizontal tubes through which the gaseous reaction mixture is passed, or in other similar forms. The contact masses therefore cannot be prepared in the apparatus in which they are to be used, and are usually charged to the apparatus in a preformed state. The handling of the contact mass, incident to its transportation to the apparatus and its charging into the apparatus, tends to dislodge or dust-off a part of the catalyst coating. Furthermore, in many types of processes the speed of the gas mixture passing in contact with the catalyst is high, and, unless the catalyst coating is securely held by the carrier, some of it is removed by the gas mixture and carried out of the catalyst chamber. In many cases the apparatus is subject to considerable vibration, either from other moving apparatus installed in the same building, or the equipment employed in connection with the process itself, which also tends to dislodge the catalyst from the carrier. Since the activity of the contact mass depends on the catalytic oxide coating, these losses of catalytic oxide decrease the activity of the contact mass and considerably shorten its period of usefulness. In addition, when it is necessary to remove the contact mass from the catalytic apparatus, as for the purpose of inspecting or repairing it, the lack of adherence of the catalytic oxide to the carrier and the resulting excessive loss of activity of the contact mass make reuse of the contact mass uneconomical, so that it must be discarded and replaced by a new contact mass.

In addition to the above disadvantages of vanadium oxide contact masses prepared by the evaporation of an aqueous solution of ammonium meta-vanadate, these contact masses have the further objections that the number of suitable carriers which may be employed is limited because of the poor adherence of the vanadium oxide coating to the carrier; the ammonium meta-vanadate employed as starting material is only moderately soluble in water, which necessitates the use of excessively large volumes of water, the evaporation of which is time-consuming and which causes the salt to crystallize out on the carrier from solution soon after the start of the evaporation; the catalyst thus prepared requires a high reaction temperature for the catalytic process in order to give it the desired productivity; and the productive life of the catalyst is relatively short.

Various attempts have been made heretofore to secure a relatively thin coating of catalytic vanadium oxide on a suitable carrier which will be retained with sufficient tenacity to resist the dislodging action of handling and vibration, and the erosive action of the rapidly moving gas stream; but they have not overcome the difficulties encountered in the handling and use of the finished contact masses.

I have found, in accordance with the present invention, when vanadium pentoxide or other suitable vanadium compound is heated in solution or suspension with hydrogen chloride and the resulting mass is concentrated by evaporation, that a gelatinous and/or adhesive mass can be obtained which is considered to be reduced vanadium compound. I have furthermore found, in accordance with the present invention, by associating a suitable catalyst carrier material with the mass containing the reduced vanadium compound and evaporating to dryness, a product can be obtained which does not result in material loss of the reduced vanadium compound from the carrier when handled without special care. In addition, I have found, in accordance with the present invention, when the resulting mass, comprising the carrier associated with the reduced vanadium compound, is subjected to oxidation, as by the action of an oxidizing gas at an elevated temperature, that the reduced vanadium compound is converted to a catalytic vanadium oxide or mixture of oxides which is retained by the carrier with a high degree of tenacity, and which is highly active for the vapor phase catalytic oxidation of chemical compounds.

As a result of this discovery, it is possible to prepare a vanadium oxide catalyst which can be completely formed in advance of its use and then charged to the catalytic apparatus as required, and which may be discharged from and recharged to the catalytic apparatus, when necessary, without substantial loss of the catalytically active oxide from the carrier. Furthermore, in view of the adherence of the catalytically active oxide coating to the carrier, the life of the contact mass is considerably greater than that of the vanadium oxide contact masses produced by previously employed processes above referred to, inasmuch as there is a much smaller loss of catalytic oxide due to removal of particles thereof in the form of dust by the erosive action of the gaseous mixture passing in contact with the contact mass and the vibration of the apparatus. Since the reduced vanadium compound is in a very finely divided form, in which form it is associated with the carrier and then oxidized to the final active oxide, the resulting contact mass contains the catalytically active oxide also in an extremely finely divided form, so that the specific catalytic activity of the resulting contact mass is relatively high.

The invention accordingly comprises the contact masses and catalysts having the properties and characteristics exemplified in the products hereinafter disclosed, and the processes comprising the steps and the relation of each with others thereof which are exemplified in the processes hereinafter disclosed. The scope of the invention will be indicated in the claims.

In the practice of the present invention in accordance with a preferred method of procedure, an oxygen-containing compound of vanadium in which the vanadium is in the pentavalent state is heated with hydrochloric acid until a partial reduction of the vanadium compound has been effected, for example, until a compound has been produced containing vanadium in the tetravalent state. The resulting mass, after dilution with water or other diluent, if necessary, is associated with a suitable catalyst carrier (as by mixing, coating and/or impregnating), and the mixture is evaporated to dryness. The dried product is then heated, finally in the presence of an oxidizing gas (ignited), to convert the reduced vanadium compound to the catalytically more active vanadium oxide or mixture of oxides. The resulting contact mass can then be employed for the oxidation of chemical compounds in the vapor phase.

Any suitable oxygen compound of vanadium containing vanadium in the pentavalent state may be employed as starting material for the process; as for example, vanadium pentoxide, and hydrated vanadium pentoxides or vanadic acids. Salts of vanadic acids also may be employed, preferably those which decompose without leaving an undesirable residue in the reduction mass, such as ammonium metavanadate, and the like.

The material employed as a carrier for the catalytically active oxide may be any of the usual materials, and it may be in the form of particles of any suitable size, ranging all the way from an extremely finely divided powder to lumps or granules, depending upon the process in which it is to be employed. Carriers which have rough surfaces and/or which are a porous nature are preferred inasmuch as their retentivity of the catalytically active coating is greater than that of smooth surfaced carriers. Thus, aluminum having a rough surface (so-called "grained" aluminum), pumice, silica gel, pumicite, aluminum oxide gel, kieselguhr, "Filtrose", asbestos, chamotte, and the like may be employed as carriers. "Alundum" in the form of highly porous particles and obtained by bonding minute crystals of fused aluminum oxide with aluminum silicate (as for example, that employed as a filtering medium and for gas diffusion apparatus), crushing the resulting mass and screening the crushed product, is particularly suitable for use as a carrier in connection with the present invention in view of its high porosity and resulting retentivity of the catalytic oxide, its relative infusibility, and high rigidity. When the contact mass is to be employed in the catalytic partial oxidation of organic compounds in the vapor phase, the "Alundum" is advantageously employed in the form of granules 2 to 20 mesh in size, and preferably of a size capable of passing through a screen having openings of 0.125 inch, but incapable of passing through a screen having openings of 0.076 inch.

The carrier may be associated with the reduced vanadium compound in any suitable manner and at any suitable stage of the process. Thus, it may be added to the reduction reaction mixture at the beginning of the preparation, or it may be mixed with the reduction reaction mixture at any stage during or after the reduction. It is preferably mixed with the reduction mixture while the latter is in liquid form, and a superior product is obtained by heating and evaporating an aqueous reduction reaction mixture in the absence of the carrier until a gelatinous but liquid mass is obtained, mixing water or other suitable diluent with the reduction mass to render it thinly fluid, then stirring in the carrier and agitating the resulting mixture to obtain intimate commingling and uniform coating, and finally evaporating the mixture to dryness with agitation.

Various auxiliary substances having a modifying, promoting, activating or stabilizing effect upon the catalytic activity of the vanadium oxide catalyst may be incorporated into the contact masses or associated with the vanadium oxide catalyst of the present invention; as for example, other catalysts and catalytic oxides (such as the oxides of the other metals of the fifth and of the metals of the sixth groups of the Periodic System, and particularly molybdenum oxide), an activator, such as aluminum powder; or a stabilizer, such as a caustic alkali and/or a salt of an alkali or alkaline earth metal (as for example, potassium hydroxide, the normal and acid sulfates, phosphates, carbonates, etc. of sodium and potassium, etc. as disclosed in U. S. P. 1,371,004), compounds of the rare earth metals, etc. These auxiliary substances also may be incorporated into the mass at any suitable stage of the preparation process. They are preferably mixed in suitable form with the reduction reaction mixture after completion of the reduction and while the reduction reaction mixture is in a thinly fluid condition.

The carrier associated with the reduced vanadium compound may be heated (ignited) in a current of oxidizing gas either prior to being charged into the catalytic apparatus in which it is to be used or while in place in the catalytic apparatus. It is preferably not heated to a temperature so high as to cause fusion of the resulting vanadium pentoxide, as otherwise the activity of the resulting catalyst will be impaired.

The vanadium oxide catalysts and contact masses produced in accordance with the present invention may be employed in a wide variety of processes of catalytic oxidation, and particularly in those processes of vapor phase oxidation of chemical compounds by means of air or other oxygen-containing gas where a highly active vanadium oxide catalyst is required; as for example, the oxidation of sulphur dioxide to sulphur trioxide, of ammonia to nitrogen oxides, of methane and methanol to formaldehyde, of ethyl alcohol to acetaldehyde, of chlorhydrin to chloracetic acid, of benzene, toluene and the like to maleic acid and quinones, of toluene to benzaldehyde and benzoic acid, of naphthalene and alkyl naphthalenes to phthalic acid, maleic acid and naphthaquinones, of anthracene to anthraquinone and phthalic acid, of fluorene to fluorenenone, of acenaphthene to acenaphthylene and naphthalic acid, etc. It is to be noted, however, that in some cases the conditions of the catalytic oxidation reaction may be required to be modified and/or that a modifier or stabilizer may be required to be incorporated in the contact mass in order to secure optimum results, owing to the greater activity of the vanadium oxide catalysts and contact masses of the present invention as compared with those produced simply by decomposition of ammonium metavanadate.

The invention will be illustrated by the following specific examples, in which the parts are by weight. The invention is not limited to the details thereof, however, and variations may be made within the scope of the appended patent claims.

*Example 1*

Metavanadic acid (hydrated vanadium pentoxide)—50 parts—is dissolved in concentrated hydrochloric acid—250 parts of 36 per cent. C. P. acid—contained in an open enamelled kettle equipped with agitating means and heated by a gas flame. The apparatus is preferably contained in an enclosed chamber or hood equipped with means for withdrawing gases and vapors. The solution is heated to boiling, and gentle boiling is continued until a thick dark colored, liquid mass is obtained (about three hours). Chlorine and hydrochloric acid are given off. Pumice granules 3 to 6 mesh in size—400 parts—are then added and the mixture is evaporated to dryness. The dried material is gently heated to drive off residual hydrochloric acid (10 to 12 hours). It is then ignited by heating to a temperature not exceeding 600° C. while passing a stream of air (or air mixed with vapors of an organic compound, such as benzene) over it in order to convert it to the catalytically active oxide form. The resulting contact mass, which is in the form of a very finely divided, hard, dull catalytic coating on the carrier, to which it adheres tenaciously, is then ready for use. It may be packed, transported, and charged to the catalytic apparatus without producing any substantial amount of dusting or loss of catalyst coating.

*Example 2*

Metavanadic acid—106 parts—is added to concentrated hydrochloric acid—525 parts of 36 per cent. C. P. acid—and the mixture is heated as in the previous example. When the mixture has boiled down to a gelatinous but still fluid mass, water—440 parts—and a modifier of the catalytic activity of vanadium oxide—1.3 parts of potassium hydroxide—are added, and the mixture is agitated to form a solution or colloidal suspension of the reduced vanadium compound. A porous carrier in the form of small granules or lumps—815 parts of fragments of porous "Alundum" 8 to 12 mesh in size—is added to the mixture, the mass is evaporated to substantial dryness with agitatation, and the dried mass is then heated to drive off residual material, mainly hydrochloric acid. The resulting coated carrier is charged into the catalytic apparatus in which it is to be employed, and it is then heated to a temperature somewhat below the fusing point of vanadium pentoxide while air is passed over or through it, to convert the coating to the catalytically more active form.

*Example 3*

*Part I.*—To a solution of ammonium metavanadate (1 part) in about 24 parts of distilled water at a temperature of about 65° to 72° C.

dilute nitric acid (9.5 per cent. HNO₃) is slowly added, with good stirring, until the solution is just acid toward Congo red test paper. The faintly acid solution is heated to boiling, and the solution is boiled until the vanadium salt is practically all precipitated (e. g., until a colorless or faintly colored filtrate is obtained by filtering off a test portion). During the whole boiling period the solution should be kept faintly acid toward Congo red test paper by the addition, if necessary, of nitric acid from time to time. When the precipitation is complete, the precipitate, which is red in color, is filtered off and washed with hot distilled water until the washings give no test for acidity toward Congo red paper. It way be dried at 70° to 110° C. and, if desired, stored in a dry place. A product is obtained containing an amount of vanadium equivalent to about 90 to 90.5 per cent. of vanadium pentoxide. This product will be hereinafter referred to as "Vanadium red precipitate."

*Part II.*—Vanadium red precipitate — 156 parts— prepared as described in Part I, is treated with concentrated hydrochloric acid—900 parts of acid having a specific gravity of 1.20. The mixture is boiled until substantial solution of the Vanadium red precipitate is effected and evolution of free chlorine practically ceases, additional amounts of concentrated hydrochloric acid being added, if necessary, from time to time to complete the reduction and maintain solution of the resulting reduced vanadium compound. The resulting solution is usually more or less turbid, and remains so even on prolonged treatment with hydrochloric acid. When most, if not all, of the free chlorine has been evolved, fragments of a highly porous alundum carrier—1150 parts of fragments of a size of about an 8 mesh screen formed of wire .025 inch in diameter—is added, and the mixture is evaporated to dryness with constant agitation and then heated to about 150° to 200° C. to drive off hydrochloric acid. The resulting coated carrier is then heated in a current of air to about 500° to about 550° C. in order to obtain the catalyst in final active form.

The contact masses of the above examples are useful for the catalytic oxidation of chemical compounds in the gas or vapor phase mixed with air or other oxidizing gas. Thus, for example, by passing naphthalene vapors mixed with air, in a weight ratio of about 1 to 30, in contact with said contact masses at temperatures of about 550° to about 600° C., excellent yields of phthalic anhydride of very good quality can be obtained.

The amount and strength of hydrochloric acid employed in the above examples may be varied. An amount is preferably employed which contains, in addition to a sufficient amount of acid to reduce all of the vanadium compound employed as the starting material to a state corresponding with vanadium tetroxide, a sufficient excess of acid to provide for losses due to evaporation and to enable the reaction to be completed in a minimum amount of time. The reaction is more rapid the greater the excess of hydrochloric acid, within limits. The excess hydrochloric acid remaining after completion of the reduction may be removed during the ignition operation, if desired; but owing to the objectionable nature of the acid fumes it is preferably driven off separately.

Other hydrohalides, except hydrogen fluoride, may be used as reducing agents in carrying out the process, namely hydrobromic acid and hydriodic acid. Hydrochloric acid is preferably employed in view of its specific reducing action and the especially advantageous properties of the resulting product. The reducing agent is preferably employed in an amount at least theoretically sufficient to reduce all of the vanadium compound to the tetravalent state.

United States Patent 1,880,678 discloses a method for making a contact mass particularly adapted for use in the contact method of making sulfuric acid involving absorbing by a porous silicious carrier non-alkaline solutions of soluble compounds of vanadium and an alkali metal. In one example, the patent discloses a method for making a contact mass of this type in which commercial vanadium pentoxide is suspended in water containing potassium hydroxide. After boiling to dissolve the vanadic oxide as potassium metavanadate, the solution is filtered from insoluble matter. The theoretical amount of hydrochloric acid to form KCl and precipitate V₂O₅ is then added, and SO₂ gas is passed into the suspension until the precipitate is all dissolved in the form of a vanadyl salt, apparently vanadyl sulfate. This solution after addition of more potassium chloride is used to saturate Celite chips which are then dried. The only apparent purpose of the preliminary treatment is to secure V₂O₅ in a purified form for use in making their contact mass. My process of producing a contact mass is distinct from the above-described method of the patient, since the hydrochloric acid used in that method is employed merely for the purpose of converting the potassium metavanadate to potassium chloride and to precipitate V₂O₅.

Since changes may be made in the process and the products above disclosed without departing from the scope of the appended patent claims, all matter contained in the above description is to be interpreted as illustrating and not limiting the invention, except as limited by the claims.

I claim:

1. The process of producing a catalyst which comprises associating a catalyst carrier with a compound prepared by reducing an oxygen-containing pentavalent vanadium compound with a hydrohalide selected from the group consisting of hydrogen chloride, hydrogen bromide, and hydrogen iodide, and subsequently igniting the resulting mixture.

2. A process of producing a catalyst which comprises heating a vanadium pentoxide compound with an excess of a hydrohalic acid selected from the group consisting of hydrochloric acid, hydrobromic acid and hydriodic acid until reduction of the vanadium pentoxide compound is effected, evaporating the resulting mass, and heating the evaporated mass in an oxidizing atmosphere.

3. In the preparation of a catalyst, the steps which comprise coating carrier particles with a product prepared by reducing an oxygen-containing pentavalent vanadium compound with a hydrohalic acid selected from the group consisting of hydrochloric acid, hydrobromic acid, and hydriodic acid, and subsequently igniting the coated particles.

4. In the preparation of a catalyst, the steps which comprise applying a hydrochloric acid reduction product of an oxygen-containing pentavalent vanadium compound to a carrier and subsequently igniting the resulting mixture.

5. A process of producing a catalyst which comprises mixing particles of a catalyst carrier with a liquid mass comprising a reduced vanadium compound prepared by reducing an oxygen-containing compound of pentavalent vanadium with hydrochloric acid, drying the resulting mixture to form a dry product consisting of said particles of a catalyst carrier coated with a dried reduced vanadium compound, and igniting the resulting dried product.

6. A process of producing a catalyst which comprises heating a vanadium pentoxide compound with a hydrohalic acid selected from the group consisting of hydrochloric acid, hydrobromic acid and hydriodic acid, in an amount at least sufficient to reduce all of the vanadium to the tetravalent state, until reduction of the vanadium pentoxide compound is effected and a gelatinous mass is produced, evaporating the resulting mass in admixture with a carrier, and heating the resulting evaporated mass in an oxidizing atmosphere.

7. A process of producing a catalyst which comprises heating a solution of an oxygen-containing compound of pentavalent vanadium in hydrochloric acid until reduction of the said vanadium compound is effected, evaporating the resulting mass to substantial dryness in admixture with a carrier, heating the dried mass to drive off volatile material comprising hydrochloric acid, and igniting the dried mass in the presence of air at a temperature not exceeding about 600° C.

8. A process of producing a catalyst which comprises heating a vanadic acid with an amount of hydrochloric acid at least sufficient to reduce all of the vanadium to the tetravalent form until reduction of the vanadic acid is effected, evaporating the resulting mass in admixture with a carrier, heating the evaporated mass to drive off volatile material comprising hydrochloric acid, and oxidizing the resulting product.

9. A process of producing a catalyst which comprises heating metavanadic acid with an amount of hydrochloric acid at least sufficient to reduce all of the vanadium to the tetravalent state until reduction of the metavanadic acid is effected, evaporating the resulting mass until a gelatinous but still fluid mass is obtained, mixing water with the evaporated mass, then adding a carrier, evaporating the resulting mixture to substantial dryness, heating the dried mass to drive off volatile material comprising hydrochloric acid, whereby a product is obtained comprising the carrier associated with a dry reduced vanadium compound, and heating said product at an elevated temperature below the fusion point of vanadium pentoxide while passing air in contact therewith, whereby an active oxidation catalyst is produced.

10. A process of producing a catalyst which comprises mixing dilute nitric acid with an aqueous solution of ammonium metavanadate, boiling the resulting mixture while maintaining it acid to Congo red test paper, whereby a red precipitate is obtained, heating the red precipitate with an amount of hydrochloric acid at least sufficient to reduce all of the vanadium to the tetravalent state until reduction of the vanadium is effected, evaporating the resulting mass to substantial dryness in admixture with a carrier, heating the dried mass to drive off volatile material comprising hydrochloric acid, whereby a product is obtained comprising the carrier associated with a dry reduced vanadium compound, and heating said product at an elevated temperature below the fusion point of vanadium pentoxide while passing air in contact therewith, whereby an active oxidation catalyst is produced.

11. A process of producing a catalyst which comprises adding dilute nitric acid to a dilute solution of ammonium metavanadate until the solution is just acid to Congo red test paper, boiling the resulting solution while maintaining it faintly acid to Congo red test paper, whereby a red precipitate is obtained, separating the red precipitate, washing it with water, heating the washed red precipitate with an amount of hydrochloric acid at least sufficient to reduce all of the vanadium to the tetravalent state until reduction of the vanadium is effected, evaporating the resulting mass to substantial dryness in admixture with a carrier, heating the dried mass to drive off volatile material comprising hydrochloric acid, whereby a product is obtained comprising the carrier associated with a dry reduced vanadium compound, and heating said product at a temperature of about 500° to about 550° C. while passing air in contact therewith, whereby an active oxidation catalyst is produced.

12. A contact mass comprisin[g] coated with the ignition pr[oduct of a hydro]chloric acid reduction produc[t of a compound con]taining pentavalent vanadiu[m.]

13. A contact mass for th[e oxida]tion of chemical compounds [comprising a] carrier associated with th[e ignition product of] a hydrochloric acid reduc[tion product of] vanadic acid and obtaine[d by heating metavanad]ic acid with an amount o[f hydrochloric acid at] least sufficient to reduce [all of the vanadium to] the tetravalent form, un[til reduction of the meta]dic acid is effected and [a gelatinous mass] is produced, evaporating the [resulting mass in] admixture with a carrier, heating [the evap]orated mass to drive off volatile material comprising hydrochloric acid, and then heating the resulting product in an oxidizing atmosphere.

14. An intermediate composition useful in the preparation of a contact mass comprising a catalyst carrier intimately associated with a dried reduced vanadium compound prepared by reducing an oxygen-containing pentavalent vanadium compound with a hydrohalide selected from the group consisting of hydrogen chloride, hydrogen bromide, and hydrogen iodide.

15. A process of producing a catalyst which comprises mixing a catalyst carrier with a liquid mass comprising a vanadium compound prepared by reducing an oxygen-containing pentavalent vanadium compound with hydrogen chloride, and drying the resulting mixture, whereby a product is obtained comprising the carrier intimately associated with the vanadium compound.

16. A contact mass comprising a carrier coated with the ignition product of a reduction product of a pentavalent vanadium compound, said reduction product being prepared by reducing said pentavalent vanadium compound with hydrochloric acid, said contact mass being prepared by applying a liquid mass comprising said reduction product to said carrier, drying the resulting mixture, and igniting the resulting dried product.

17. A process of producing a catalyst which comprises reducing an oxygen-containing compound of vanadium in which the vanadium is in the pentavalent form with a hydrohalic acid selected from the group consisting of hydrochloric acid, hydrobromic acid and hydriodic acid, whereby a mass containing a reduced vanadium compound is produced, and evaporating the resulting mass to substantial dryness in admixture with a carrier, whereby a product is obtained comprising the carrier and a dried reduced vanadium compound.

18. A process of producing a catalyst which comprises heating an oxygen-containing compound of vanadium in which the vanadium is in the pentavalent form with hydrochloric acid until a gelatinous mass containing a reduced vanadium compound is produced, and evaporating the resulting mass in admixture with a carrier, whereby a product is obtained comprising the carrier and a dry adherent reduced vanadium compound.

19. A process of producing a catalyst which comprises heating a vanadium pentoxide compound with a hydrohalic acid selected from the group consisting of hydrochloric acid, hydrobromic acid and hydriodic acid until reduction of the vanadium pentoxide compound is effected, evaporating the resulting mass in admixture with a carrier, and heating the resulting mass to drive off volatile material comprising the hydrohalic acid.

20. A process of producing a catalyst which comprises heating a vanadic acid with an amount of hydrochloric acid at least sufficient to reduce all of the vanadium to the tetravalent state until reduction of the vanadic acid is effected, evaporating the resulting mass to substantial dryness in admixture with a carrier, and heating the dried mass to drive off volatile material comprising hydrochloric acid, whereby a product is obtained comprising the carrier having a dry adherent coating of a reduced vanadium compound.

21. An intermediate composition useful in the preparation of a contact mass comprising a catalyst carrier intimately associated with a hydrochloric acid reduction product of an oxygen-containing pentavalent vanadium compound which upon heating gives off hydrogen chloride.

22. A catalyst for the vapor phase oxidation of chemical compounds comprising a catalytically active vanadium oxide obtained by a process including heating a vanadic acid with an amount of hydrochloric acid at least sufficient to reduce all of the vanadium to the tetravalent form until reduction of the vanadic acid is effected, evaporating the resulting mass, heating the evaporated mass to drive off volatile material comprising hydrochloric acid, and igniting the resulting product.

HAROLD B. FOSTER.